J. S. LEVER.

Book-Binding.

No. 8,195. Reissued April 23, 1878.

Witnesses,
Henry Howson Jr.
Harry Smith

Inventor.
James S. Lever
by his Attorneys
Howson and Son

N. PETERS, PHOTO-LITHOGRAPHER, WASHINGTON, D. C.

UNITED STATES PATENT OFFICE.

JAMES S. LEVER, OF PHILADELPHIA, PENNSYLVANIA.

IMPROVEMENT IN BOOK-BINDING.

Specification forming part of Letters Patent No. 200,068, dated February 5, 1878; Reissue No. 8,195, dated April 23, 1878; application filed March 28, 1878.

*To all whom it may concern:*

Be it known that I, JAMES S. LEVER, of Philadelphia, Pennsylvania, have invented a new and useful Improvement in Book-Binding, of which the following is a specification:

The objects of my improvement are, first, to secure to the pack of sections of a book a strip of open fabric, extending from end to end of the same, or nearly so, so that the back shall present a uniform surface, free from the ridges which are formed by transverse tapes, and by glue applied to the same, as explained hereinafter; second, to secure to the pack of sections a fabric which will afford a substantial hinge for the side boards; and, third, to prevent the lumps which disfigure ordinary books, and which are due to the thick cords commonly used for connecting the side pieces to the back.

Figure 1:
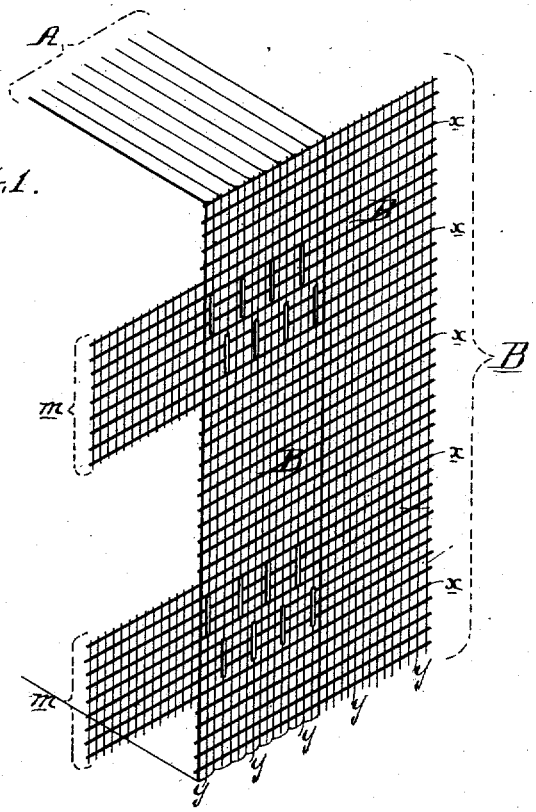
Figure 2:
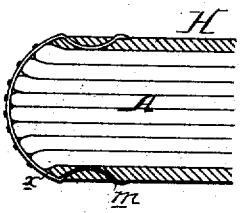

In the accompanying drawing, Figure 1 is a perspective view, illustrating my improvements, and Fig. 2 a section of part of a book, illustrating the mode of securing the sides to the same.

The usual plan adopted in securing the backs of books of the class to which my invention relates is to first secure to the backs of a pack of sections, by staples or stitches, a number of narrow transverse tapes, which project beyond the pack of sections for attachment to the side boards, glue being applied to the folded edges of the sections, as well as to the tapes, which are composed of open fabric, so that the glue will penetrate through them, and insure a proper junction of the fabric with the folded edges of the section.

The objection to this plan is that the opposite selvages of each tape, with the glue which accumulates at these edges on applying it by means of a brush, form ridges, which interfere with the proper finishing of the back of the book in completing the binding of the same.

In order to obviate this difficulty, I use a strip, B, of open fabric, extending throughout or nearly throughout the entire length of the sections, as shown in Fig. 1, the strip being secured by staples, or by ordinary stitches. On applying the glue to the exterior of this strip it will penetrate through to the folded edges of the sections without accumulating more at one point than at another, so that the back will have a uniform surface, free from the objectionable ridges before referred to, the loose projecting portions of the strip being cemented to the back, or the backs being secured in the manner described hereinafter.

While the strip may be composed of the ordinary open fabric commonly used by bookbinders, I prefer, in all cases, to use a special fabric in a manner which constitutes an important feature of my invention. This fabric consists of strong, substantial threads *x*, interwoven with lighter threads *y*, which may be more or less fragile, providing they serve to maintain the stronger threads in their proper position. The strip is so cut and applied that the strong threads shall extend across the back, so as to form a substantial medium by which the side boards are hinged to the pack of sections. While the strong threads are comparatively thick, the other threads are so thin that proper interstices are presented for the penetration of the glue. The projecting portions of the strip on each side of the back may be glued directly to the side boards; but I prefer to secure these boards in the manner which I will now proceed to describe.

After the strip B of the fabric described above has been secured to the folded edges of the sections, as shown in Fig. 1, by staples or stitches and glue, I cut away the overhanging edges, so that nothing remains but short bands or tapes *m* of the fabric, as shown on the left of Fig. 1. I then apply to the pack of sections one of the side boards H, as shown in Fig. 2, which has been pierced with an awl in the ordinary manner at points opposite the tapes *m*, after which I apply a little paste to each tape, twist the latter at the end, and pass the ends of the tapes thus pointed through the orifices in the back, as shown in Fig. 2, taking care to draw the tape tight, so that the side board may fit snugly to its place, after which I secure the opposite side board in a similar manner. As soon as the paste applied to these twisted ends of the tapes is dry the sides will be firmly secured to the back of the book, which is now ready to be finished in any style desired.

In order to understand the advantages of this plan, it will be best to bear in mind that in ordinary binding strong and comparatively thick cords are stitched to the folded edges of the sections, and that the ends of these cords are passed through orifices in the side boards, as before described. These thick cords, even in the best binding, form lumps, and these appear in the leather after the latter has been applied to complete the binding, and the consequence of this is that the leather is soon worn where the lumps occur, and the book is more or less disfigured.

In my improvement the projecting tapes *m* are twisted at the end for insertion through the orifices of the side boards; but the portion of the tape near the edge of the board is so flat as to present but a very slight protuberance, which scarcely appears on the surface of the leather. At the same time these flat portions of the tape constitute strong hinges for the side boards, owing to the direction in which the strong strings of the fabric are arranged.

I do not desire to claim, broadly, the combination of a pack of sections with a strip extending from end to end of the sections; but

I claim as my invention—

1. The combination, in a book, of a pack of sections with a strip, B, of open fabric, extending throughout, or nearly throughout, the entire length of the back, and secured to the sections by staples or stitches, and by glue or other equivalent cement which will penetrate through the fabric, all as set forth.

2. The combination of the sections and side boards of a book with a strip of fabric having strong transverse threads interwoven with light longitudinal threads, and secured to the folded backs of said sections, all substantially as set forth.

3. The mode herein described of securing the sides of books to the sections—that is to say, securing a strip of open fabric by staples or stitches and glue or other equivalent cement to the sections, cutting away the strips, so as to leave tapes *m*, and securing the latter to the sides, all as set forth.

In testimony whereof I have signed my name to this specification in the presence of two subscribing witnesses.

JAMES S. LEVER.

Witnesses:

HARRY A. CRAWFORD,
HARRY SMITH.